United States Patent Office 2,746,889
Patented May 22, 1956

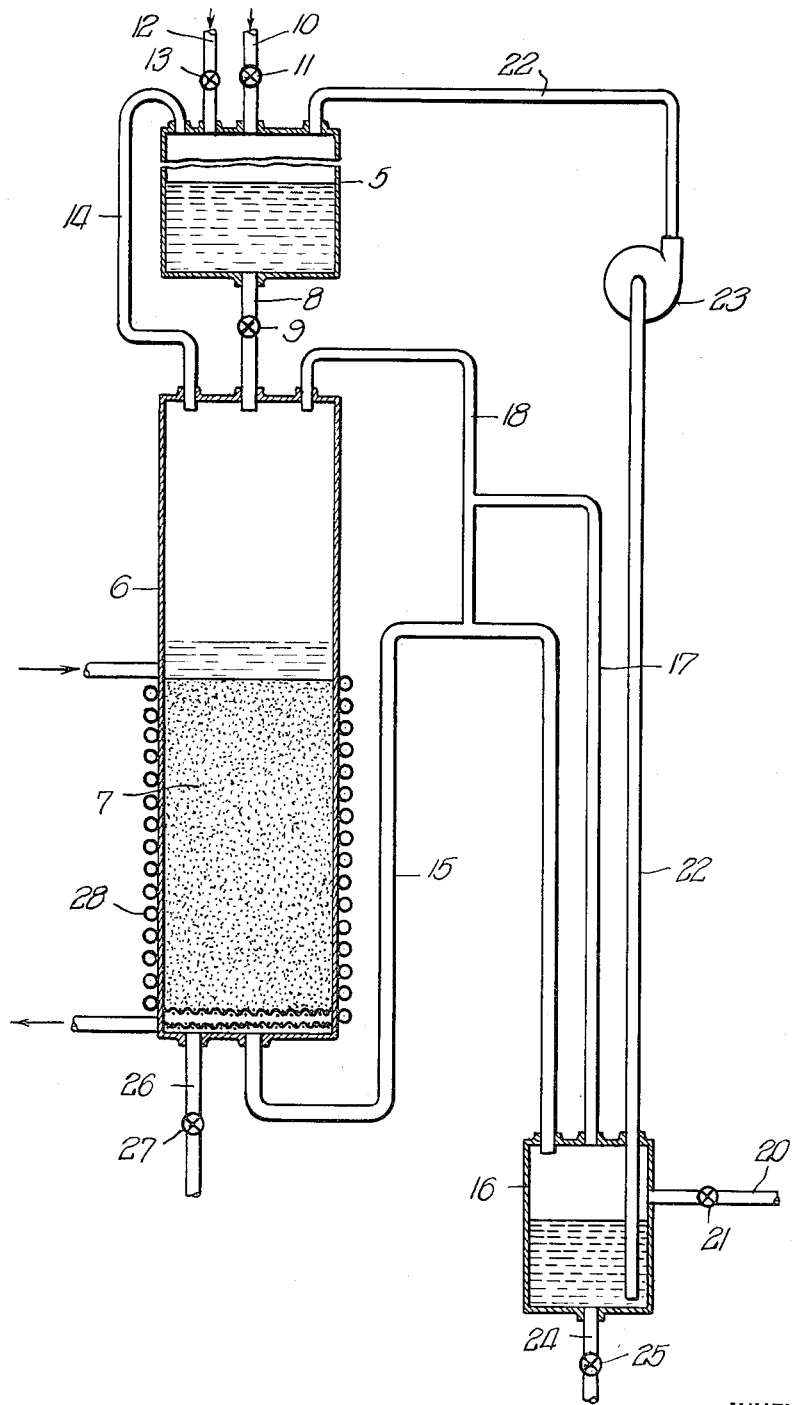

2,746,889

INTERCONVERSION OF SUGARS USING ANION EXCHANGE RESINS

David P. Langlois and Roy F. Larson, Decatur, Ill., assignors to A. E. Staley Manufacturing Company, Decatur, Ill., a corporation of Delaware Application July 27, 1954, Serial No. 445,986

8 Claims. (Cl. 127—36)

This invention relates, generally, to improvements and innovations in the treatment of sugar solutions so as to interconvert the sugar content thereof to other sugars, and it relates particularly to a new and practical process for interconverting the dextrose content of dextrose solutions, particularly, corn syrups to sweeter sugars, namely levulose or fructose.

Large tonnages of corn syrup are produced annually in this country and also in a number of foreign countries. Corn syrup is produced commercially by the conversion of starch and is therefore sometimes referred to as starch conversion syrup. Except for its water content, corn syrup consists primarily of dextrose (a monosaccharide also known as glucose), maltose (a disaccharide), a small amount of high sugars, and dextrins. The exact proportions and content of these primary constituents vary from one syrup to another depending upon a number of factors. Substantial quantities of corn syrup are dried and sold in solid or dry form. In addition, there is a substantial commercial production of crystalline dextrose, dextrose being the end product obtained upon complete conversion of starch.

Corn syrups, both in the liquid and dried form, and crystalline dextrose are useful for a number of known purposes. These products can be produced at low cost in high quality and, in general, constitute one of the most economical sources of sugar. They exhibit certain unique physical properties which make them especially attractive for many purposes. However, dextrose is not as sweet as sucrose (i. e., cane and beet sugars) and therefore corn syrup and dextrose are not fully satisfactory for those uses wherein a high degree of sweetness is required.

Certain reducing sugars which are isomers of dextrose are, however, sweeter than dextrose, particularly the isomer known either as levulose or fructose. In this connection it has been long known that one sugar may be interconverted or isomerized into another. The earliest work on the interconversion of sugars appears to have been done by Lobry de Bruyn and Van Ekenstein (Rec. trav. chim. 14, 203 (1895)). These investigators found that sugars were interconverted under alkaline conditions.

Despite the fact that it has long been known that interconversion of sugars is theoretically possible, no practical interconversion process appears to have been developed. A primary difficulty has been that many side products were concomitantly produced in such large amounts as to make the interconversion reactions impractical. For example, when a dextrose solution is interconverted with alkali according to the usual and known methods, an undesirably large portion of the dextrose is converted to non-sugar materials, chiefly acids, which not only have no sweetness value but usually impart objectionable flavors to the reaction product. Dark brown colored bodies are also formed and the removal of the dark color is at best a costly and difficult problem.

The object of the present invention is the provision of a practical process of interconverting dextrose, particularly the dextrose in corn syrups, into its much sweeter isomer, fructose or levulose, with only small sugar loss, without formation of dark brown color bodies, without the development of objectionable flavor, and with such acid substances as are formed being absorbed so as not to contaminate the reaction solution.

Another object of the invention is the provision of a suitable apparatus and method of operating the same wherein a solution of dextrose or corn syrup is repeatedly brought into contact with a bed of strongly basic ion exchange resin while all headspaces in the apparatus are filled at all times with an inert gas such as nitrogen.

Certain other objects of the invention will in part be obvious and will in part appear hereinafter. For a complete understanding of the nature and scope of the invention reference may now be had to the following detailed description thereof and to the appended claims taken in connection with the accompanying drawing wherein the single figure is a schematic diagram of apparatus suitable for practicing the invention.

The invention is based on the discovery that anion or basic ion exchange resins can be used as very efficient catalysts for the interconversion of dextrose to levulose provided that the reaction is carried out in the absence of air or oxygen. Otherwise the dextrose loss is so high and the formation of undesirable color bodies and flavor-imparting substances is so great as to render the process impractical. One practical and effective way of insuring that the reaction is carried out in the absence of air or oxygen is to use solutions which are free of air and employ a blanket of nitrogen or other inert gas throughout the headspaces or gas spaces throughout the apparatus or equipment.

The use of highly basic resins as catalysts avoids the formation of salts or ionic materials such as would be formed if alkaline reagents such as sodium hydroxide or calcium hydroxide were employed.

Reference may now be had to the accompanying drawing for a description of one suitable apparatus and method of carrying out the interconversion of dextrose in accordance with the invention. A solution of either dextrose or corn syrups, as the case may be, is introduced into a tank 5 which is located above a column 6 containing a bed 7 of strongly basic ion exchange resin. The bed 7 is supported on a screen at the bottom of the column 6 as indicated. Both the tank 5 and the column 6 are enclosed and the syrup or dextrose solution is conveyed by gravity from the tank into the top of the column 6 by a pipe 8 provided with valve 9.

Solutions of dextrose or corn syrups are introduced into the tank 5 through a pipe 10 provided with a valve 11. Nitrogen or other inert gas under pressure is introduced into tank 5 and the system through a line 12 provided with a valve 13. A pressure equalizing line 14 communicates between the top of tank 5 and the column 6 whereby the pressure of nitrogen or other inert gas in the headspaces of these two vessels are equalized.

An outlet pipe 15 leads from the bottom of the column 6 into the top of a receiver tank 16. The pipe 15 rises to a level above the bed of resin 7 so as to establish and maintain the liquid level in the column 6 above the top of the bed, as indicated. The pressure of the inert gas in the headspace of the receiver tank 16 is equalized with that in the headspace of the column 6 by means of a pipe 17 having a vertical leg which rises from the top of the tank 16 up to a point above the top of pipe 15 where it has a horizontal arm which extends to one side and connects with the vertical leg of a pipe 18 connecting between the top of pipe 15 and the top of the column 6. In order that some inert gas under a slight excess pressure may flow continuously through the system, the headspace of the receiver tank 16 is provided with an outlet connection 20 provided with a valve 21.

In order that the dextrose solution undergoing treatment may be repeatedly passed through the bed of resin 7 until the desired degree of interconversion is obtained, a return pipe 22 is provided which extends from adjacent the bottom of the tank 16 to the top of the tank 5. A recirculating pump 23 of known type is located in the pipe line 22.

The receiver tank 16 is provided with a drain pipe 24 having a valve 25 therein so that the contents may be drained therefrom. The column 6 is similarly provided with a drain pipe 26 having a valve 27 therein.

In order that the temperature of the solution undergoing treatment may be controlled the column 6 is surrounded by a heating coil 28 through which a heating liquid at suitable temperature may be circulated.

*Example 1*

In one test in which the apparatus shown in the drawing was employed, the resin bed 7 was Dowex #1 and Dowex #2 resin in the chloride state. The resin was regenerated with 5% NaOH solution and washed to remove excess caustic. This treatment gave a 60 to 70% conversion of the resin to the hydroxyl state. Dextrose was dissolved in water to give a 18–20% solution. This solution was boiled to expel all the oxygen. After the apparatus was flush out with nitrogen by opening the valves 13 and 21 so as to remove all air, the boiled dextrose solution was introduced into the holding tank 5 through the filling line 10 with the valve 11 open. Valve 11 was closed after the solution was introduced. Valve 21 was left slightly open in order that a small quantity of nitrogen could continue to flow through the apparatus and prevent the influx of air.

Valve 9 is opened and the dextrose solution flows downward by gravity through resin bed 7 out through pipe 15 and into receiver tank 16. After the level of the solution in the tank 16 has risen sufficiently above the bottom end of the pipe 22 the pump 23 is started so as to recirculate the dextrose solution through the resin bed 7. Samples of the solution were withdrawn from time to time until the specific rotation of the reaction sugar mixture became constant at about +6°. This corresponds to 32% conversion to levulose or fructose as determined by polarization at 87° C.

Several runs were made at different temperatures to determine the effect of temperature on the rate of the interconversion action. At 125° F. a specific rotation of 7° was obtained in 17½ hours; at 110° F. the reaction required 24 hours; and, at 95° F. the time required was 40 hours.

The resin slowly lost its basicity due to the absorption of acids. Based on the reduction in acid absorptive capacity of the resin it was calculated that the dextrose lost by conversion to acids during the interconversion treatment was between 8 to 12.5%.

The final solution obtained was free of saccharinic acids, was very sweet, had no objectionable flavor, and was water clear.

*Example 2*

The process of Example 1 was repeated using demineralized corn syrups of various dextrose contents. The conversion of the dextrose to other sugars and the establishment of an equilibrium at about 32% levulose, 4% mannose and 62% dextrose, occurred in a manner similar to that reached in the treatment of a pure dextrose solution. The non-dextrose carbohydrate solids in the corn syrup (i. e., maltose, higher sugars and dextrins) act only as diluents. Therefore the process is especially useful for increasing the sweetness of corn syrup. The final syrups obtained were acid free, were very sweet, had no objectionable flavor, and were water clear after a mild carbon treatment.

It will be apparent to those skilled in the art that a number of changes may be made in the foregoing apparatus and process without departing from the fundamental principles of the invention. For example, instead of employing a single ion exchange column, a series of columns could be used in known manner with the dextrose solutions or corn syrups passing continuously through such columns in series—the untreated solutions or syrups being first passed through the most nearly exhausted column and the furtherest converted solutions of syrups being passed through the freshly regenerated column. One or more columns may be temporarily off-line and undergoing regeneration. Ion-exchange systems of this type are known and commercially available together with accessory equipment and automatic controls, which may be used for carrying continuously out interconversion reactions in accordance with this invention.

The invention is not limited to the interconversion of dextrose to other sugars. The interconversion is reversible and therefore levulose may be converted to dextrose in the manner.

Nitrogen is the inert gas of choice because it is cheap, easy to handle, non-explosive and inert with respect to the resins and the solutions. Hydrogen or helium could also be used.

The Dowex #1 and Dowex #2 in resin bed 7 may be replaced with one or more other highly basic anion exchange resins of the same type such as Resinous Products Company's Amberlite I. R. 400. These are all polystyrene resins containing quaternary ammonium groups.

Having fully described the invention and the presently preferred means for and method of practicing the same, what is claimed as new is:

1. The method of treating sugar solutions which are subject to interconversion to interconvert the sugar content thereof which comprises contacting a substantially oxygen and ash-free sugar solution with a highly basic ion exchange resin at a temperature above room temperature and in the presence of an inert gas.

2. The method of treating dextrose-containing solutions to interconvert a portion of the dextrose to sweeter sugars which comprises contacting a substantially oxygen and ash-free dextrose-containing solution with a highly basic ion exchange resin at a temperature above room temperature and in the presence of an inert gas.

3. The method of treating a substantially oxygen and ash-free levulose-containing solution to interconvert a portion thereof to dextrose which comprises contacting the solution with a highly basic ion exchange resin at a temperature above room temperature and in the presence of an inert gas.

4. The method of treating corn syrup solutions to interconvert the sugar content thereof and thereby increase the sweetness which comprises contacting a substantially oxygen and ash-free corn syrup solution with a highly basic ion exchange resin at a temperature above room temperature and in the presence of an inert gas.

5. The method of treating a substantially ash-free dextrose-containing solution to interconvert a portion of the dextrose content to levulose which comprises removing oxygen from said solution, passing said solution through at least one bed of highly basic ion exchange resin retained in an enclosed container and maintained at a temperature above room temperature, and maintaining an oxygen-free atmosphere of nitrogen in the headspace of said container.

6. The method of treating substantially ash-free corn syrup to increase the sweetness thereof which comprises, removing oxygen from the syrup, passing the syrup through at least one bed of highly basic ion exchange resin retained in an enclosed column and maintained at a temperature above room temperature, and maintaining an oxygen-free atmosphere of nitrogen in the headspace of said column.

7. The method of treating substantially oxygen and ash-free dextrose-containing solution to interconvert a portion of the dextrose content to levulose which comprises passing said solution at a temperature above room temperature through at least one oxygen-free bed of highly basic ion exchange resin retained in an enclosed container while continuously maintaining an oxygen-free atmosphere of inert gas in the headspace of said container.

8. The method of treating substantially oxygen and ash-free corn syrup to increase the sweetness thereof which comprises passing said syrup at a temperature above room temperature through at least one oxygen-free bed of highly basic ion exchange resin retained in an enclosed column while continuously maintaining an oxygen-free atmosphere of nitrogen in the headspace of said column.

References Cited in the file of this patent
UNITED STATES PATENTS

| | | |
|---|---|---|
| 2,354,664 | Cantor | Aug. 1, 1944 |
| 2,487,121 | Fetzer | Nov. 8, 1949 |
| 2,534,694 | Blann | Dec. 19, 1950 |